(12) United States Patent
Depta et al.

(10) Patent No.: US 10,815,004 B2
(45) Date of Patent: Oct. 27, 2020

(54) LENS STRUCTURE FOR A LIGHT UNIT, LIGHT UNIT, AND AIRCRAFT COMPRISING SUCH LIGHT UNIT

(71) Applicant: Goodrich Lighting Systems GmbH, Lippstadt (GB)

(72) Inventors: Marion Depta, Lippstadt (DE); Norbert Menne, Paderborn (DE); Elmar Schrewe, Anröchte-Uelde (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 16/034,585

(22) Filed: Jul. 13, 2018

(65) Prior Publication Data

US 2019/0016473 A1    Jan. 17, 2019

(30) Foreign Application Priority Data

Jul. 14, 2017 (EP) .................................... 17181561

(51) Int. Cl.
*B64D 47/02* (2006.01)
*F21V 5/04* (2006.01)
*F21V 17/10* (2006.01)

(52) U.S. Cl.
CPC ............ *B64D 47/02* (2013.01); *F21V 5/045* (2013.01); *F21V 17/107* (2013.01); *B64D 2203/00* (2013.01)

(58) Field of Classification Search
CPC ................................ G09F 21/06; G09F 21/10
See application file for complete search history.

(56) References Cited

U.S. PATENT DOCUMENTS

| 6,132,072 A | 10/2000 | Turnbull |
| 2005/0128759 A1* | 6/2005 | Fredericks ............. B64D 47/06 362/470 |
| 2012/0268950 A1 | 10/2012 | Parkyn et al. |
| 2015/0276170 A1 | 10/2015 | Motoyanagi et al. |

OTHER PUBLICATIONS

Extended European Search Report for International Application No. 17181561.6 dated Aug. 28, 2017, 7 pages.

* cited by examiner

*Primary Examiner* — Joseph L Williams
*Assistant Examiner* — Jacob R Stern
(74) *Attorney, Agent, or Firm* — Cantor Colburn LLP

(57) ABSTRACT

A lens structure for placement over a light source and for attachment to a circuit board around the light source includes a circuit board engagement portion for being placed towards the circuit board, a recess provided in the circuit board engagement portion for receiving the light source upon attachment of the lens structure to the circuit board, a light entry surface around the recess, a lens body, a light exit surface distal from the circuit board engagement portion, and an attachment structure, the attachment structure being partially molded into the lens body and partially extending from the lens body for attaching the lens structure to the circuit board.

12 Claims, 5 Drawing Sheets

LENS STRUCTURE FOR A LIGHT UNIT, LIGHT UNIT, AND AIRCRAFT COMPRISING SUCH LIGHT UNIT

FOREIGN PRIORITY

This application claims priority to European Patent Application No. 17181561.6 filed Jul. 14, 2017, the entire contents of which is incorporated herein by reference.

TECHNICAL FIELD

The present invention is in the field of light units. In particular, the present invention is in the field of light units in demanding operating environments. Further in particular, the present invention is in the field of exterior aircraft light units, provided for illuminating the aircraft surroundings and/or particular parts of the aircraft structure.

BACKGROUND

Aircraft lighting is a complex field of technology. On the one hand, exterior aircraft light units have very specific and tightly controlled optical requirements. In particular, light is only allowed to be emitted in certain sectors and the light output has to satisfy certain light intensity requirements. On the other hand, exterior aircraft light units have to be able to withstand large mechanical stresses, which may be induced by the large temperature variations between flight conditions and on the ground and/or which may be induced by vibrations due to turbulences, aerodynamic forces, and/or impact forces upon touch-down. It is challenging to construct light units that reliably produce a desired light output and that have sufficient mechanical resistance for demanding operating environments.

Accordingly, it would be beneficial to provide a light unit and light unit components that provide for an improved mechanical resilience of the light unit. Further, it would be beneficial to provide an aircraft equipped with such light unit.

SUMMARY

Exemplary embodiments of the invention include a lens structure for placement over a light source and for attachment to a circuit board around the light source, the lens structure comprising a lens body, which comprises a circuit board engagement portion for being placed towards the circuit board, a recess provided in the circuit board engagement portion for receiving the light source upon attachment of the lens structure to the circuit board, a light entry surface around the recess, and a light exit surface distal from the circuit board engagement portion. The lens structure further comprises an attachment structure, the attachment structure being partially molded into the lens body and partially extending from the lens body for attaching the lens structure to the circuit board.

Exemplary embodiments of the invention provide a lens structure that allows for a strong mechanical connection of the lens body to the circuit board. The partial embedding of the attachment structure into the lens body via molding provides for a strong bond between the lens body and the attachment structure. With the partially embedded attachment structure extending from the lens body, a well-defined structure for attachment to the circuit board is provided as well. The attachment structure being partially molded into the lens body and partially extending from the lens body means that particular portions/elements of the attachment structure run partially within the lens body and partially outside of the lens body. Those portions/elements combine an inherent bond to the lens body and a free end for attachment to the circuit board.

Exemplary embodiments of the invention further allow for a highly accurate placement of the lens structure with respect to a circuit board, and thus with respect to a light source, due to the attachment structure being integrated into the lens body and thus having an inherently set positional relationship to the lens body. As compared to previous approaches, where the lens body and the attachment structure are separate elements that are locked in position with respect to each other via a positive fit, e.g. via noses in the lens body that are clipped or pinned into a separate attachment structure, the integration of the lens body and the attachment structure allows for a well-controlled positional relation of the optical element and the portion establishing the positioning with respect to the circuit board. As compared to previous approaches, where production tolerances of the lens body on the one hand and the attachment structure on the other hand potentially added up, the integration of the lens body and the attachment structure leads to the situation that the production tolerances of said integrated structure can be controlled as a whole and can be kept to comparably low limits, thus helping in creating a closely controlled and accurate light emission distribution.

The provision of the recess and the light entry surface around the recess allows for an effective and space-efficient coupling of the light from the light source into the lens body. Also, the recess allows for an intimate placement of the lens structure towards the circuit board, keeping the overall extension of the resulting light unit small.

The lens body has a light entry surface and a light exit surface. The lens body is an optical lens. At least one of the light entry surface and the light exit surface is a refractive surface. In particular, both the light entry surface and the light exit surface may be refractive surfaces. The lens body is transparent to light. In operation, light travels from the light entry surface to the light exit surface within the lens body. The optical lens, formed by the lens body, thus transforms the light intensity distribution, as emitted by the light source, into an output light intensity distribution. In particular, the lens body may be a collimating optical lens, i.e. it may have a collimating effect on the light emitted by the light source.

Exemplary embodiments of the invention therefore allow for a strong integration of the lens structure into the light unit, yielding high mechanical resistance as well as high manufacturing accuracy due to the integrated nature of the lens body and the attachment structure, while requiring an overall small space envelope.

According to a further embodiment, the attachment structure comprises a plurality of legs extending into and out of the lens body. Providing a plurality of legs that are partially molded into the lens body is an effective way of having the attachment structure be integrated into the lens body, while providing elements that can be positioned accurately onto and attached well to the circuit board.

According to a further embodiment, the plurality of legs comprise, on the outside of the lens body, spring clips for insertion into corresponding openings in the circuit board. In this way, a form fit between the legs and the circuit board can be attained. In particular, the plurality of legs can be pushed conveniently into the circuit board without the need for elaborate tooling, and the spring clips can provide for a firm attachment via their spring forces.

According to a further embodiment, the plurality of legs comprise, on the outside of the lens body, soldering joints for being soldered onto the circuit board. In this way, the plurality of legs allow for creating an adhesive bond between the lens structure and the circuit board, when being soldered onto the circuit board. In this way, a firm attachment between the lens structure and the circuit board, having high mechanical resistance for demanding environments, may be achieved.

According to a further embodiment, the attachment structure comprises a support element within the lens body, with the plurality of legs extending from the support element. In this way, a reinforced attachment structure may be provided where the plurality of legs and the support element support each other and provide a strong base structure, onto which the lens body may be molded. In particular, the support element and the plurality of legs may form a base for the molding of the lens body during manufacture and for supporting the lens body during operation. The plurality of legs may be attached to or integrally formed with the support element.

According to a further embodiment, the support element is a ring-shaped support element or a star-shaped support element. In particular, the support element may be a substantially flat ring-shaped or star-shaped support element. The term star-shaped refers to a geometric arrangement where a number of arms extend from a center point. If the number of arms equals four, the star-shaped support element may also be referred to a cross-shaped support element. The number of arms of the star-shaped support element may correspond to the number of legs. Each leg may extend out of the lens body from one of the arms of the star-shaped support element.

According to a further embodiment, the plurality of legs are separate legs. In other words, there is no joined support element, from which the plurality of legs originate. The plurality of legs are independent structural elements that are individually molded into the lens body of their one ends and that provide for individual attachment points to the circuit board on their other ends.

According to a further embodiment, the attachment structure is a one-piece structure. In other words, all elements of the attachment structure are attached to each other in some way, e.g. via a support element described above. This allows for a strong structural support and easy handling during manufacture, because the attachment structure can be handled as a singular piece.

According to a further embodiment, the attachment structure is made of metal. In particular, the attachment structure may be made of steel, in particular corrosion resistant steel. Further in particular, the attachment structure may be made of corrosion resistant steel that may be passivated to allow for fixation to a non-electrochemically compatible metal core PCB, which may comprise aluminum or copper. It is also possible that the attachment structure is made of a chemically inert plastic, such as polyamide, PEEK or PEI.

According to a further embodiment, the light exit surface is a dome-shaped surface, with light entering through the light entry surface travelling directly from the light entry surface to the light exit surface. The expression of the light travelling directly from the light entry surface to the light exit surface means that no total internal reflection takes place within the lens body. In other words, the light propagates through the lens body on a straight path and does not get reflected internally in the lens body. Both the light entry surface and the light exit surface may be refractive surfaces. In particular, both the light entry surface around the recess and the dome-shaped light exit surface may be light collimating surfaces. In this way, the light from the light source, which is commonly spread over a wide angular range, may be collimated in two steps via the light entry surface and the light exit surface.

According to a further embodiment, the lens body has a total internal reflection surface, with at least a portion of the light entering through the light entry surface experiencing total internal reflection at the total internal reflection surface. In particular, the total internal reflection surface may have a collimating effect on the light travelling through the lens body. Further in particular, the total internal reflection surface may have a parabolic or elliptical shape. The provision of a total internal reflection surface is another effective and space-efficient way of providing a collimating effect on the light.

According to a further embodiment, the lens body is a rotationally symmetric structure. Also, the attachment structure may be a rotationally symmetric structure. It is also possible that the attachment structure has two halfs that are mirror images of each other.

According to a further embodiment, the lens body is made of molded silicone. Silicone is a highly resistant material for demanding environments. In particular, silicone is able to withstand large temperature variations, such as the temperature variations from −55° C. to +120° C., which are present in an exterior aircraft environment. Further, silicone is resistant to a wide range of chemicals that may be encountered in an aircraft environment and that are potentially harmful for other materials. Also, silicone has some degree of elasticity, such that the joined lens structure made from the lens body and the attachment structure can expand and retract reliably. This is particularly the case if the lens body of molded silicone is used in combination with an attachment structure made of metal. The elasticity of a lens body made of molded silicone may also help in engaging the lens structure well with the circuit board during production. The elasticity of the silicone may help in placing the attachment structure in a desired position with respect to the circuit board. In general, the lens structure may be made from any suitable material that is transparent and that can be transformed from a liquid state for molding into a solid state, in particular an elastomeric solid state, for operation as a lens body.

According to a further embodiment, the lens body is made of molded resin, in particular molded polyurethane resin, or molded PMMA or molded PPSU or molded PC. These materials are also suitable for providing above described strong mechanical bond between the lens body and the attachment structure, while allowing for efficient light propagation therethrough.

Exemplary embodiments of the invention further include a light unit comprising a circuit board, a light source mechanically attached and electrically connected to the circuit board, and a lens structure, as described in any of the embodiments above, wherein the lens structure is attached to the circuit board via its attachment structure and the recess of the lens structure is arranged over the light source. The modifications, additional elements, and effects, described above with respect to the lens structure, apply to the light unit in an analogous manner. The light unit may have further elements, such as a housing and a transparent cover. The circuit board, the light source, and the lens structure may be arranged in the space between the housing and the transparent cover. Further, the light unit may have electrical connections to an outside power source, such as to an aircraft on-board electricity network. It is also possible that the light unit has an internal power source.

According to a further embodiment, the light source is an LED. LEDs are highly reliable, power-efficient, and space-efficient light sources. With the LED only requiring a small amount of space, the design of the lens structure with the recess for receiving the LED can be made use of particularly well, and an overall very space-efficient light unit may be provided.

According to a further embodiment, a gap is provided between the light source and the light entry surface around the recess. In this way, an efficient first refraction at the light entry surface from a thin medium, such as air, into the lens body medium may take place. This allows for an efficient first step in shaping the output light intensity distribution of the light unit.

According to a further embodiment, the circuit board is a printed circuit board.

According to a further embodiment, the light unit is an exterior aircraft light unit. The light unit, as described in any of the embodiments above, is particularly suitable as an exterior aircraft light unit. The strong integration of the lens body with respect to the attachment structure and, thus, with respect to the light unit allows for good mechanical resistance in the highly demanding aircraft environment, dealing well with large temperature stresses, large vibrations and substantial mechanical shocks. The resulting exterior aircraft light unit is very durable. The integration of the lens body and the attachment structure may also allow for a highly space-efficient and/or weight-efficient implementation of the light unit.

According to a further embodiment, the light unit is a wing illumination light unit or an engine scan light unit or a landing light unit or a taxi light unit or a runway turn-light unit or a take-off light unit.

Exemplary embodiments of the invention further include an aircraft, such as an air plane or a helicopter, comprising at least one light unit, as described in any of the embodiments above, wherein the light unit is arranged in an exterior portion of the aircraft. As described above, the lens structure as well as the light unit comprising said lens structure have high mechanical resistance and allow for a very accurate shaping of the output light intensity distribution. In this way, an exterior aircraft light unit, i.e. a light unit arranged in an exterior portion of the aircraft, with high mechanical resistance and closely controlled light emission characteristics may be provided. The exterior aircraft light unit has high performance and low maintenance efforts. This in turn allows for the aircraft to have decreased maintenance efforts and increased operational safety due the high performance of the exterior aircraft light unit. The modifications, additional elements, and effects, described above with respect to the lens structure and with respect to the light unit, apply to the aircraft in an analogous manner.

According to a further embodiment, the light unit, arranged in an exterior portion of the aircraft, is a wing illumination light unit or an engine scan light unit or a landing light unit or a taxi light unit or a runway turn-off light unit or a take-off light unit. These terms are understood to refer to light units that have the mentioned functionality and that may have additional functionalities. For example, the term wing illumination light unit is intended to encompass a pure wing illumination light unit and a combined wing illumination and engine scan light unit. Analogous considerations apply to the other mentioned light units.

Exemplary embodiments of the invention further includes a method of producing a lens structure for placement over a light source and for attachment to a circuit board around the light source, the method comprising the following steps: providing an attachment structure, and molding a lens body onto the attachment structure, with the attachment structure being partially molded into the lens body and partially extending from the lens body for attaching the lens structure to the circuit board, wherein the step of molding the lens body comprises forming a recess in a circuit board engagement portion of the lens body, the recess being formed for receiving the light source upon attachment of the lens structure to the circuit board. The modifications, additional elements, and effects, described above with respect to the lens structure and with respect to the light unit, apply to the method of producing a lens structure in an analogous manner.

BRIEF DESCRIPTION OF THE DRAWINGS

Further exemplary embodiments of the invention are described below with respect to the accompanying drawings, wherein.

DETAILED DESCRIPTION

Figure 1:
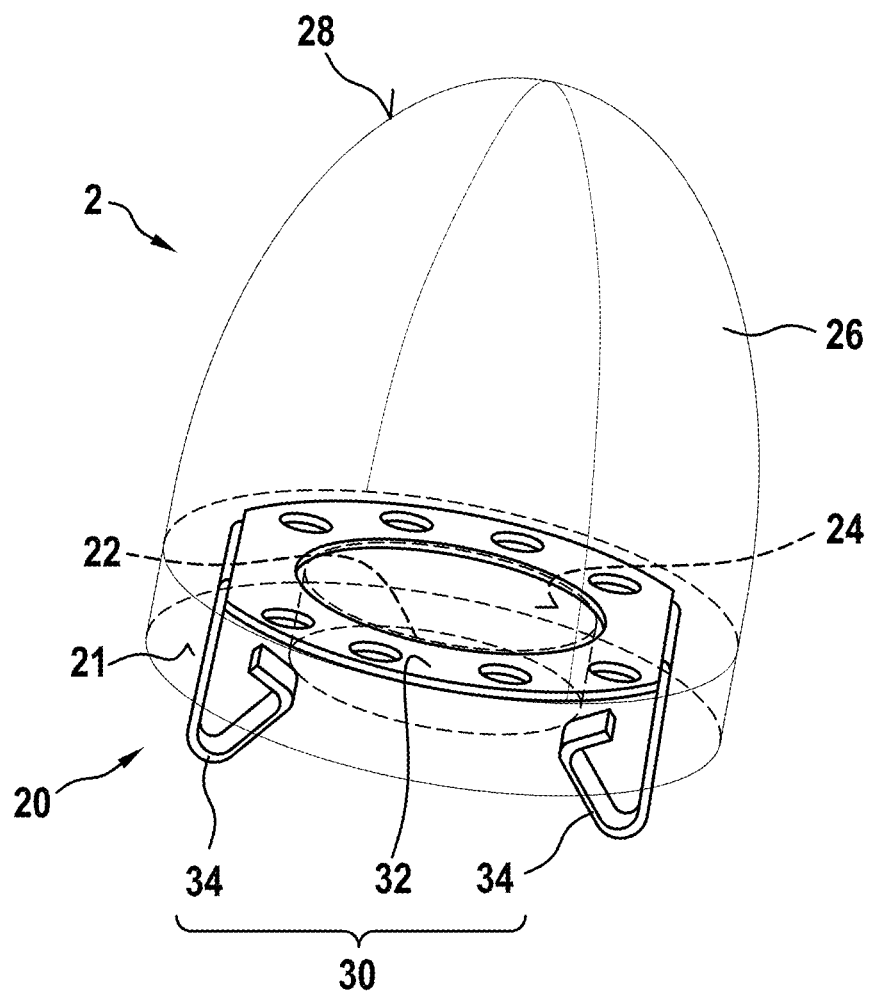
FIG. 1 shows a lens structure in accordance with an exemplary embodiment of the invention in a perspective view.

FIG. 1 shows a lens structure 2 in accordance with a first exemplary embodiment in a perspective view. The lens structure 2 comprises a lens body 26 and an attachment portion 30 that is partially molded into the lens body 26 and partially extends from the lens body 26.

The lens body 26 has a dome-shaped light exit surface 28. In particular, the light exit surface 28 has a parabolic or elliptical shape. The light exit surface 28 is shown to be the upper portion of the lens body 26 in the perspective view of FIG. 1. In other words, the light exit surface 28 is the upper surface of the lens body 26 in the exemplary embodiment of FIG. 1.

On the lower end of the lens body 26, in the viewing direction of FIG. 1, there is provided a circuit board engagement portion 20. The circuit board engagement portion 20 has an annular support surface 21, with which the lens structure 2 may be placed onto a circuit board. In the center of the support surface 21, there is provided a recess 22. The recess 22 is an empty space and is suitable for receiving a light source, when the lens structure 2 is placed onto a circuit board. The recess 22 has a cylindrical shape.

The recess 22 forms a light entry surface 24 for coupling light into the lens body 26. As the recess is cylindrical in shape, the light entry surface 24 has a flat circular surface portion and an annular surface portion between the flat circular surface portion and the support surface 21. The flat circular surface portion and the annular surface portion are jointly arranged around the recess. In the other words, the light entry surface 24 is arranged around the recess 22.

In operation, light from the light source, arranged in the recess 22, enters into the lens body 26 through the light entry surface 24. In particular, light may enter into the lens body both through the flat circular surface portion of the light entry surface 24 and through the annular surface portion of the light entry surface 24, described above. The light entry surface 24 has a first collimating effect on the light from the light source, i.e. a wide opening angle of the light intensity distribution of the light source is decreased at the light entry surface 24. The individual light rays then travel in a straight line from the light entry surface 24 to the light exit surface 28 through the lens body 26. The dome-shaped light exit surface 28 has a second collimating effect on the light, i.e. the opening angle of the light intensity distribution of the light leaving the lens body 26 is further reduced. In this way, the light from the light source experiences two steps of collimation at the light entry surface 24 and at the light exit surface 28. The lens structure 2 thus emits a fairly targeted light output. The particular level of collimation of the light output may be adapted via the geometries of the light entry surface 24 and/or the light exit surface 28.

As pointed out above, an attachment structure 30 is partially integrated into the lens body 26 and partially extends from the lens body 26. In the exemplary embodiment of FIG. 1, the attachment structure 30 comprises a ring-shaped support element 32 that is completely molded into the lens body 26. In particular, the ring-shaped support element 32 is arranged close to and around the recess 22, i.e. in a lower portion of the lens body 26 in the viewing direction of FIG. 1. The attachment structure 30 further comprises two legs 34. The legs 34 are integrally formed with the ring-shaped support element 32, such that the attachment structure 30 is a one-piece structure. The legs 34 extend within the lens body 26 from the ring-shaped support element 32 towards the support surface 21 and extend out of the lens body 26 from the support surface 21. In this way, the legs 34 are partially molded into the lens body 26 and partially extend from the lens body 26. In other words, the legs 34 partially extend into the lens body 26 and partially extend out of the lens body 26. The portions of the legs 34 extending out of the lens body 26 comprise spring clips, which will be described in detail below with respect to FIG. 2.

Figure 2:
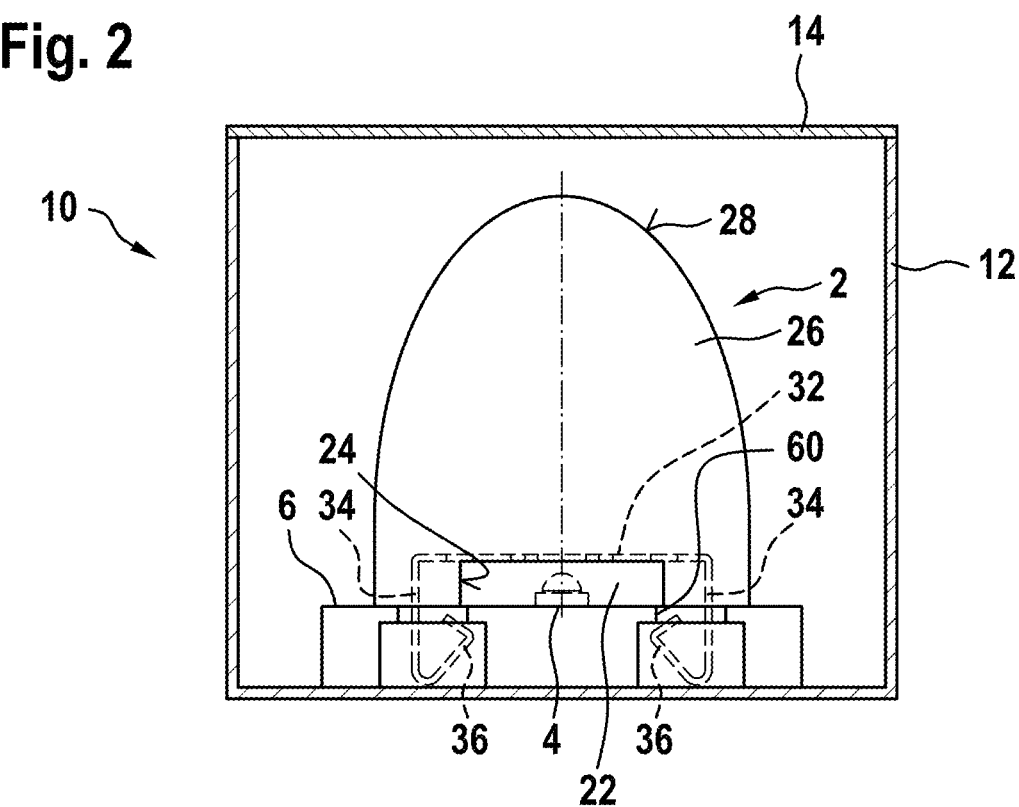
FIG. 2 shows a light unit in accordance with an exemplary embodiment of the invention in a cross-sectional view, the light unit comprising the lens structure of FIG. 1.

FIG. 2 shows a light unit 10 in accordance with an exemplary embodiment of the invention in a cross-sectional view. The light unit 10 comprises the lens structure 2 of FIG. 1. Further, the light unit 10 comprises a light source 4 and a circuit board 6. Taking the circuit board 6 as a horizontal reference plane, the cross-sectional view of FIG. 2 is a vertical cross-sectional view. The light unit 10 further comprises a housing 12 and a transparent lens cover 14. The lens structure 2, the light source 4 and the circuit board 6 are arranged in the space between the housing 12 and the lens cover 14.

In FIG. 2, the lens structure 2 is shown in a state of attachment to the circuit board 6. The attachment of the lens structure 2 to the circuit board 6 is effected via the legs 34 of the attachment structure 30 of the lens structure 2. As described above, the legs 34 extend from the support element 32 out of the lens body 26. On their free ends, i.e. downwards in the viewing direction of FIG. 1, the legs 34 have spring clips 36.

The spring clips 36 are formed by the particular shape of the legs 34. On their free ends, i.e. downwards in the viewing direction of FIG. 2, each of the legs 34 has a first portion extending downwards and a second portion extending obliquely upwards, in particular roughly towards the location of the light source 4. Due to their geometry, the first portion and the second portion form a spring. When pushed together, the angled first and second portions produce a counter-force, thus forming the spring clip 36. When pushed towards each other, the first and second portions can be inserted into corresponding openings of a circuit board. After passing through the openings, the spring force pushes the leg portions apart, such that the legs are clipped into the circuit board. In FIG. 2, the legs 34, having the spring clips 36, are shown to have been inserted into openings 60 of the circuit board 6.

On their free ends, the legs 34 further have a third portion, also extending obliquely upwards and extending towards an outside of the lens structure 2. The third portions follow the second portions and have an angle of about 90° with respect to the second portions. When the lens structure 2 is clipped into the circuit board 6, the third portions abut against the inside of the openings 60. This abutment prevents the lens structure 2 from detaching from the circuit board 6.

The recess 22 of the lens structure 2 receives the light source 4, which is mechanically attached to and electrically connected to the circuit board 6. The recess 22 has dimensions that are greater than the dimensions of the light source 4. In this way, a gap between the light source 4 and the light entry surface 22 is present. It is nicely illustrated in FIG. 2 that the light entry surface 22 has the two surface portions discussed above, with the flat circular surface portion being provided on top of the light source 4 in the viewing plane of FIG. 2 and with the annular surface portion being shown towards the left and right of the light source 4 in the viewing plane of FIG. 2.

The light source 4 is an LED in the exemplary embodiment of FIG. 2.

Figure 3:
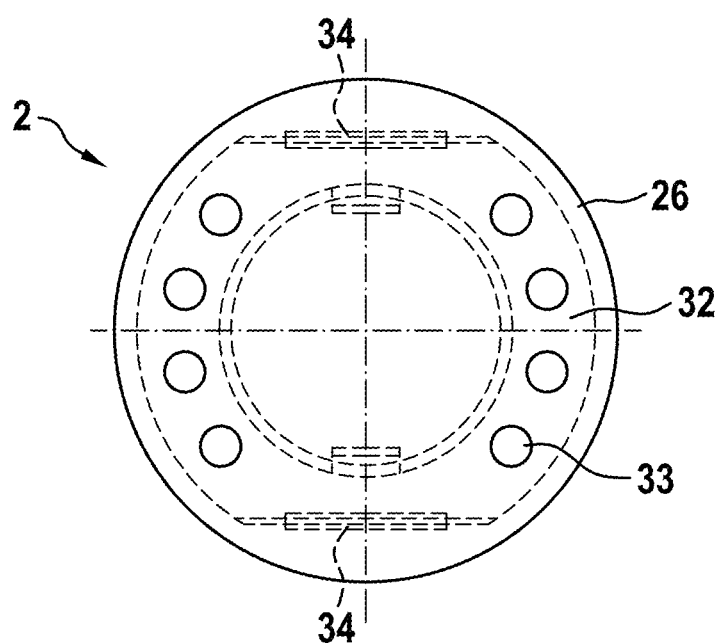
FIG. 3 shows the lens structure of FIG. 1 in a cross-sectional view.

FIG. 3 shows the lens structure 2 of FIG. 1 in another cross-sectional view. The cross-sectional plane of FIG. 3 is parallel to the annular support surface 21. In particular, the cross-sectional plane of FIG. 3 is along the ring-shaped support element 32. The ring-shaped support element 32 has a plurality of holes 33, namely eight holes 33. These holes save material and weight.

Figure 4:
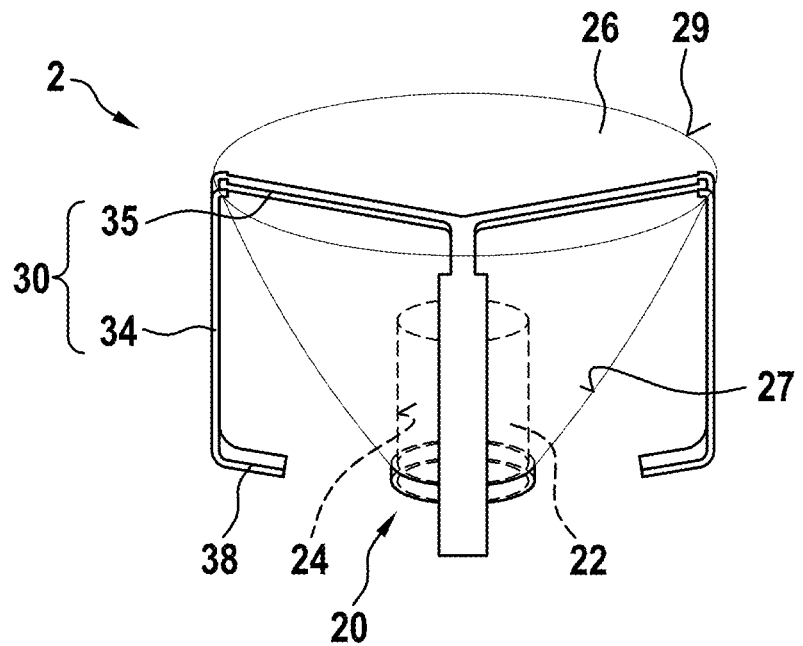
FIG. 4 shows a lens structure in accordance with another exemplary embodiment of the invention in a perspective view.

FIG. 4 shows a lens structure 2 in accordance with another exemplary embodiment of the invention in a perspective view. The lens structure 2 also has a lens body 26 and an attachment structure 30, with the attachment structure 30 being partially molded into the lens body 26 and partially extending from the lens body 26. The lens body 26 of FIG. 4 also has a circuit board engagement portion 20, a cylindrical recess 22, a light entry surface 24, and a light exit surface 29. The cylindrical recess 22 and the light entry surface 24 are conceptionally the same as in the FIG. 1 embodiment, with only the dimensions being different. Therefore, reference is made to the description of FIG. 1 above.

The lens body 26 further has a total internal reflection surface 27. The total internal reflection surface 27 is parabolic or elliptical. The total internal reflection surface 27 forms a bowl-shaped outer portion of the lens body 26. The light exit surface 29 is a flat circular surface. The light exit surface 29 caps the bowl-shaped total internal reflection surface 27 to the top in the exemplary embodiment of FIG. 4. Upon entering the lens body 26 through the light entry surface 24, a portion of the light experiences total internal reflection at the total internal reflection surface 27, before leaving the lens body 26 through the light exit surface 29. Another portion of the light travels directly through the lens body to the light exit surface 29.

The light from a light source, arranged in the recess 22, also experiences two collimating effects. First, the light from the light source is collimated at the light entry surface 24, as described above with respect to FIG. 1. Second, the total internal reflection at the total internal reflection surface 27 has a further collimating effect on the light. This second effect only applies to part of the light from the light source, as described above. However, as this second collimating effect strongly collimates the more peripheral portions of the light intensity distribution of the light source, an overall strong collimation of the light output may be achieved. Depending on the particular geometries of the light entry surface 24 and the total internal reflection surface 27, the flat light exit surface 29 may have an optical effect on all light or only on a portion of the light. In particular, it is possible that the light, after experiencing total internal reflection at the total internal reflection surface 27, hits the flat light exit surface 29 orthogonally. In that case, the light travels straight through the flat light exit surface 29.

The attachment structure 30 has a star-shaped support element 35 and three legs 34. The star-shaped support element 35 has a center point, from which three arms extend outwards towards a circumference of the lens body 26. The star-shaped support element 35 is a substantially plane element, with its plane of extension being substantially parallel to a circuit board, onto which the lens structure 2 is to be placed. The star-shaped support element 35 is arranged close to the light exit surface 29. The arms of the star-shaped support element 35 are comparably small in cross-section, in order to have little impact on the light propagation through the lens body 26. Each of the arms of the star-shaped support element 35 is connected to one of the three legs 34. In particular, each of the arms of the star-shaped support element 35 is integrally formed with one of the three legs 34. Accordingly, the whole attachment structure 30 is a one-piece structure.

The legs 34 extend out of the lens body 26 from the star-shaped support element 35. In particular, the legs 34 extend down to the level of the circuit board engagement portion 20. At their free ends, the legs 34 have soldering joints 38. The soldering joints 38 allow for the legs 34 to be attached to a circuit board via soldering.

Figure 5:
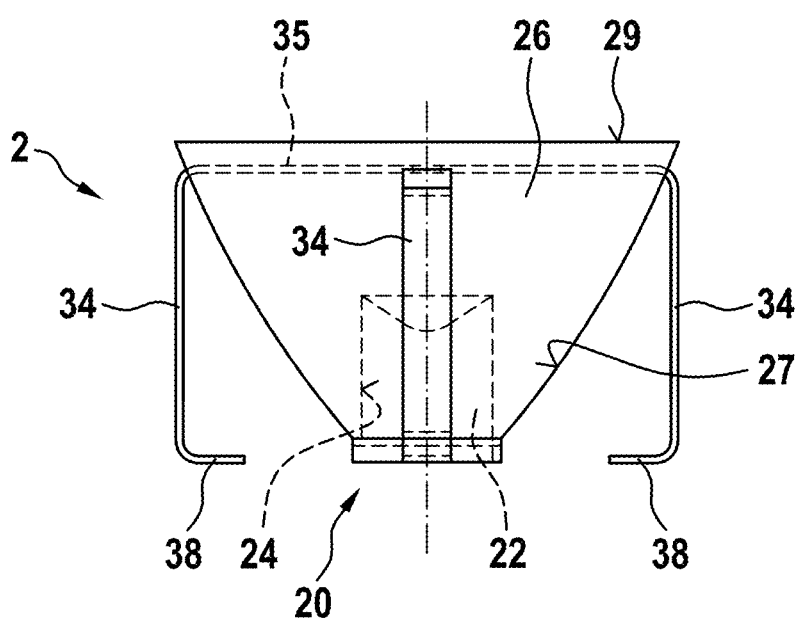
FIG. 5 shows the lens structure of FIG. 4 in a side view.

FIG. 5 shows the lens structure 2 of FIG. 4 in a side view. It is nicely illustrated that the soldering joints 38 of the legs 34 extend to the same level as the circuit board engagement portion 20. In this way, the lens structure 2 can be placed on a circuit board with the soldering joints 38 and the circuit board engagement portion 20 in a highly stable manner.

Figure 6:
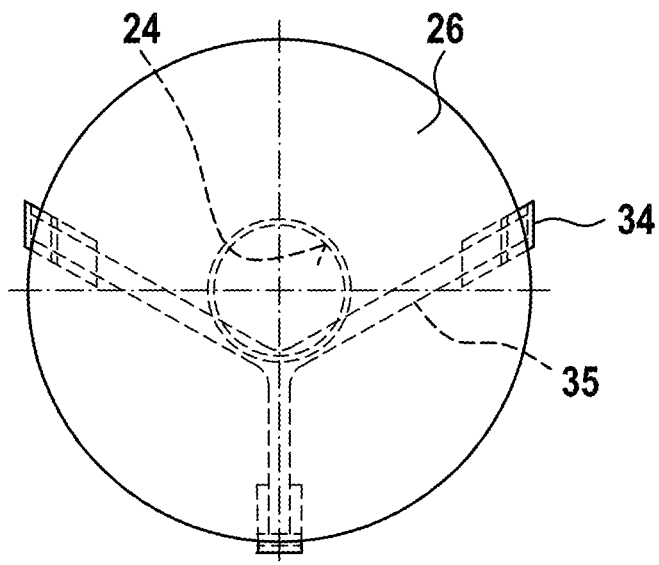
FIG. 6 shows the lens structure of FIG. 4 in a cross-sectional view.

FIG. 6 shows the lens structure 2 of FIG. 4 in a cross-sectional view. The cross-sectional plane of FIG. 6 is along the star-shaped support element 35. It can be seen that the star-shaped support element 35 is arranged off-center with respect to lens body 26. In particular, the center point of the star-shaped support element 35, from where the three arms extend, is offset with respect to the center axis of the rotationally symmetric lens body 26. In this way, the main light emission direction of the light source, which may be aligned with the center axis of the lens body 26, is free of disturbances by the star-shaped support element 35.

Figure 7:
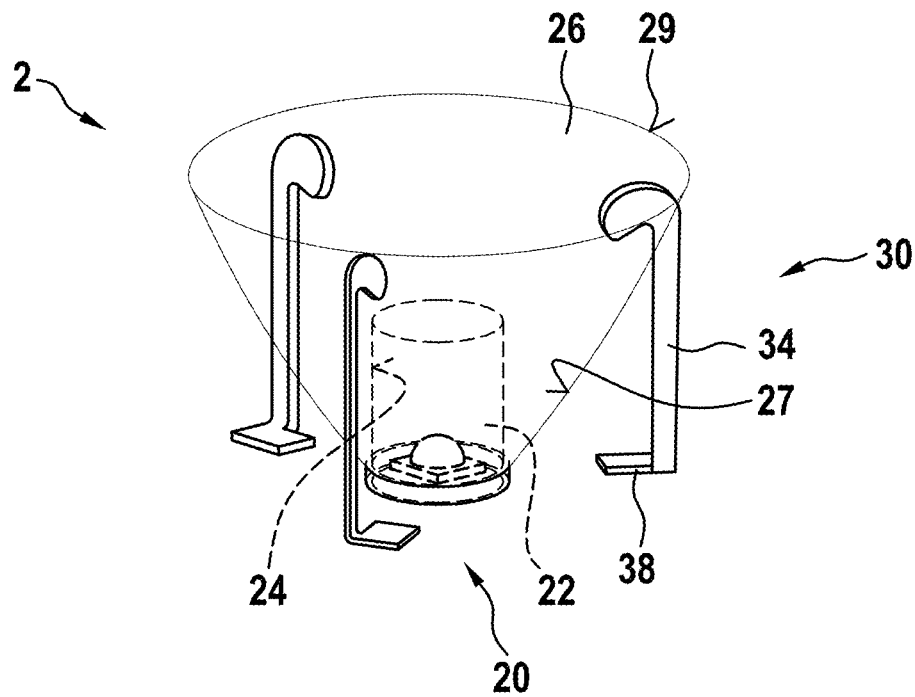
FIG. 7 shows a lens structure in accordance with yet another exemplary embodiment of the invention in a perspective view.

FIG. 7 shows a lens structure 2 in accordance with yet another exemplary embodiment of the invention in a perspective view. The lens structure 2 of FIG. 7 is similar to the lens structure 2 of FIG. 4. In particular, the lens body 26, including its circuit board engagement portion 20, its recess 22, its light entry surface 24, its total internal reflection surface 27, and its light exit surface 29, is the same as the lens body 26 of FIG. 4. Reference is made to above description thereof.

The attachment structure 30 of the lens structure 2 of FIG. 7 is different from the attachment structure 30 of the lens structure 2 of FIG. 4. In particular, the attachment structure 30 of the lens structure 2 of FIG. 7 consists of three legs 34. The three legs 34 are separate from each other. Each of the three legs 34 is partially molded into the lens body 26 and partially extends from the lens body 26. Similar to the legs 34 of the FIG. 4 embodiment, the legs 34 of the FIG. 7 embodiment have soldering joints 38 on their free ends for being soldered onto a circuit board. On their other ends, i.e. on the ends molded into the lens body 26, the legs 34 have hook-shaped portions 39. The hook-shaped portions 39 provide for a strong integration into the lens body 26. As compared to the attachment structure 30 of FIG. 4, the attachment structure 30 of FIG. 7 has no support element that connects the legs 34 within the lens body. While this may result in less support for the legs 34, the absence of the support element leaves a greater portion of the lens body unimpeded for light propagation.

Figure 8:
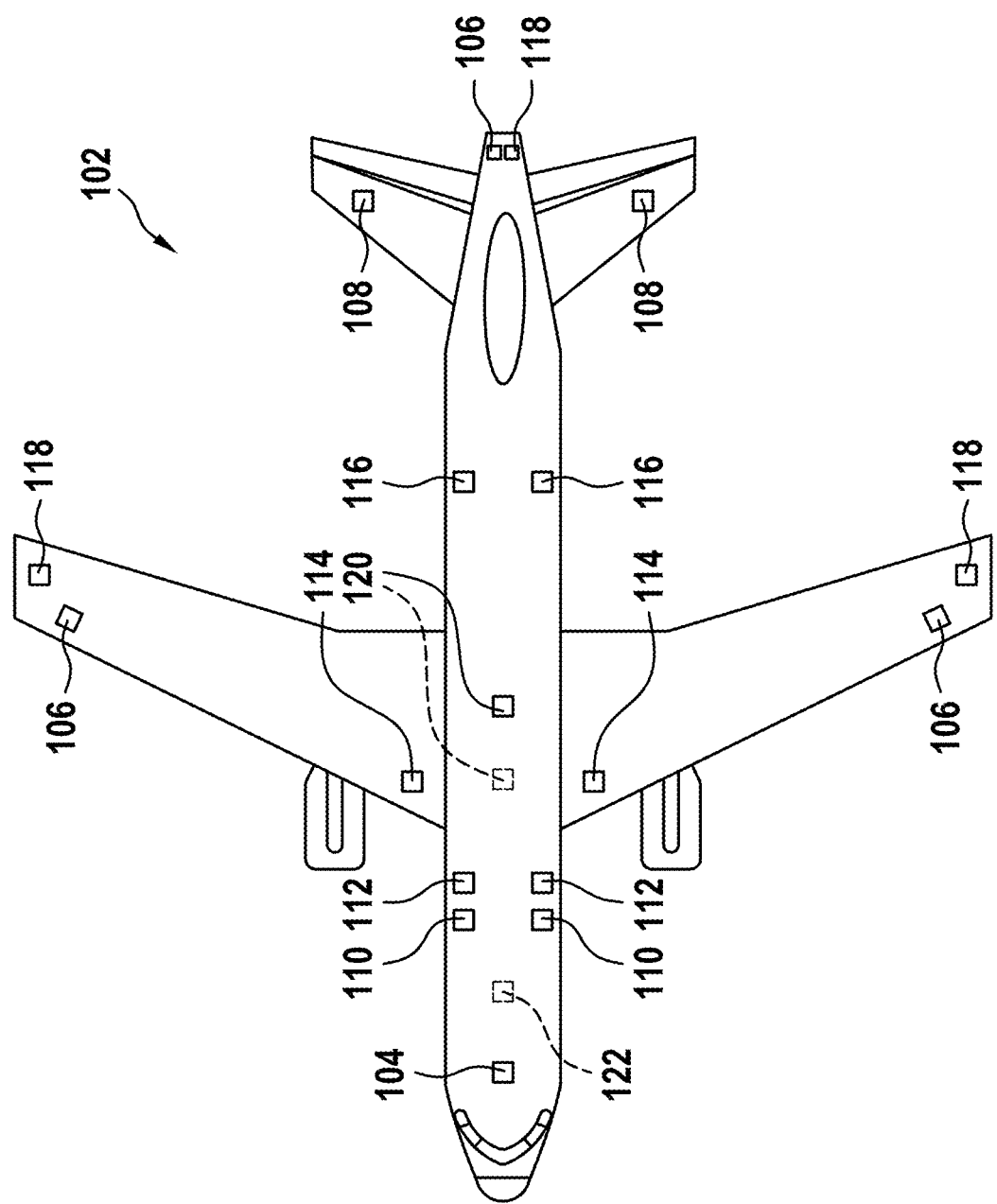
FIG. 8 shows an aircraft in accordance with an exemplary embodiment of the invention, with potential locations for light units in accordance with exemplary embodiments of the invention being indicated.

FIG. 8 shows an aircraft 102 and various components of an exterior aircraft lighting system of the aircraft 102. The exterior aircraft lighting system comprises a control unit 104 and a variety of exterior lights. The control unit 104 is configured to control the exterior lights of the aircraft 102, as described below. The aircraft 102 is an air plane in the exemplary embodiment of FIG. 8.

The aircraft 102 of FIG. 8 has a wide variety of exterior lights. In particular, the aircraft 102 has three navigation lights 106, two logo lights 108, two wing scan lights 110, two engine scan lights 112, two runway turnoff lights 114, two cargo loading lights 116, three anti-collision strobe lights 118, two anti-collision beacon lights 120, and a landing light 122. It is pointed out that these kinds of lights and their numbers are exemplary only and that the aircraft 102 may have additional lights that are not shown, such as taxi lights and take-off light, which may for example be provided at the same location as the landing light 122.

The three navigation lights 106 are positioned in the left and right wing tips as well as the tail of the aircraft 102. In normal flight conditions, each one of the navigation lights 106 emits light in one of the colors green, red and white, thus indicating to the aircraft environment if they are looking at the port side, starboard side or tail side of the aircraft. The navigation lights are normally on during all phases of the flight and in all flight conditions.

The logo lights 108 are directed to the vertical stabiliser of the aircraft 102 and are provided for illuminating the same, in particular for illuminating the logo commonly provided on the vertical stabiliser. The logo lights 108 are normally switched on for the entire duration of the flight during night flights. It is also possible that the logo lights are only used during taxing on the airport and are normally switched off during the flight.

The wing scan lights 110 and the engine scan lights 112 are positioned on the left and right sides of the aircraft fuselage, in front of the roots of the wings of the aircraft 102. The wing scan lights 110 and the engine scan lights 112 are normally off during the flight and may be switched on periodically or upon reasonable cause by the pilots or by the aircrew, in order to check the wings and the engines of the aircraft 102. The runway turnoff lights 114 are positioned in the roots of the wings. They are directed forwards and are normally switched off during the flight and switched on during taxiing, at least at night. The cargo loading lights 116 are positioned on the left and right sides of the aircraft fuselage, behind the wings and in front of tail structure of the aircraft 102. They are normally switched off during the flight of the aircraft 102.

The anti-collision strobe lights 118 are positioned in the left and right wing tips as well as at the tail of the aircraft 102. The anti-collision strobe lights 118 emit respective sequences of light flashes during normal operation of the aircraft 102. It is also possible that the anti-collision strobe lights 118 are only operated during night and bad weather conditions. The anti-collision beacon lights are positioned on the top and the bottom of the fuselage of the aircraft 102. They are arranged at the height of the wings in the longitudinal direction of the aircraft 102. While one of the anti-collision beacon lights 120 is disposed on the top of the fuselage, the other one of the anti-collision beacon lights 120 is disposed on the bottom of the fuselage and is therefore shown in phantom. The anti-collision beacon lights 120 are normally switched on during the flight. Their output is perceived as a sequence of light flashes in a given viewing direction.

The landing light 122 is attached to the front running gear of the aircraft 102, which is normally stored within the fuselage and is deployed during landing, taxiing and take off. As the landing light 122 is also arranged on the bottom of the aircraft 102, it is also shown in phantom.

The light unit 10 of the exemplary embodiment of FIG. 2 may be used for any of the lights described above with respect to FIG. 8. The shape of the housing and the transparent lens cover may be adapted to the particular position and attachment structure of the individual light units. Also, depending on the desired light intensity for a given light unit, the light unit may have multiple light sources and multiple lens structures. Each of the lens structures may be in accordance with any of the embodiments described above.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A lens structure for placement over a light source and for attachment to a circuit board around the light source, the lens structure comprising:
    a lens body, comprising:
        a circuit board engagement portion for being placed towards the circuit board,
        a recess provided in the circuit board engagement portion for receiving the light source upon attachment of the lens structure to the circuit board,
        a light entry surface around the recess, and
        a light exit surface distal from the circuit board engagement portion; and
    an attachment structure, the attachment structure being partially molded into the lens body and partially extending from the lens body for attaching the lens structure to the circuit board;
    wherein the attachment structure comprises a plurality of legs extending into and out of the lens body, and
    wherein the attachment structure comprises a support element completely molded into the lens body, with the plurality of legs extending from the support element, and wherein the support element is a ring-shaped support element or a star-shaped support element, and wherein the support element is spaced at least as far from the circuit board engagement portion of the lens body as a distal end of the recess.

2. A lens structure according to claim 1, wherein the plurality of legs comprise, on the outside of the lens body, spring clips for insertion into corresponding openings in the circuit board.

3. A lens structure according to claim 1, wherein the plurality of legs comprise, on the outside of the lens body, soldering joints for being soldered onto the circuit board.

4. A lens structure according to claim 1, wherein the attachment structure is a one-piece structure.

5. A lens structure according to claim 1, wherein the attachment structure is made of metal.

6. A lens structure according to claim 1, wherein the light exit surface is a dome-shaped surface, with light entering through the light entry surface travelling directly from the light entry surface to the light exit surface.

7. A lens structure according to claim 1, wherein the lens body has a total internal reflection surface, with at least a portion of the light entering through the light entry surface experiencing total internal reflection at the total internal reflection surface.

8. A lens structure according to claim 1, wherein the lens body is made of at least one of: molded silicone, molded resin, molded polyurethane resin, molded PMMA, molded PPSU, and molded PC.

9. A light unit, comprising:
    a circuit board,
    a light source, mechanically attached and electrically connected to the circuit board, and
    a lens structure according to claim 1, the lens structure being attached to the circuit board via its attachment structure and the recess of the lens structure being arranged over the light source.

10. A light unit according to claim 9, wherein the light source is an LED.

11. An aircraft, such as an air plane or a helicopter, comprising at least one light unit according to claim 9, wherein the light unit is arranged in an exterior portion of the aircraft, with the light unit in particular being one of a wing illumination light unit, an engine scan light unit, a landing light unit, a taxi light unit, a runway turn-off light unit, and a take-off light unit.

12. A method of producing a lens structure for placement over a light source and for attachment to a circuit board around the light source, the method comprising the following steps:
    providing an attachment structure, and
    molding a lens body onto the attachment structure, with the attachment structure being partially molded into the lens body and partially extending from the lens body for attaching the lens structure to the circuit board, with the attachment structure comprising a plurality of legs extending into and out of the lens body, with the attachment structure comprising a support element completely molded into the lens body, with the plurality of legs extending from the support element, and with the support element being a ring-shaped support element or a star-shaped support element, wherein the step of molding the lens body comprises forming a recess in a circuit board engagement portion of the lens body, the recess being formed for receiving the light source upon attachment of the lens structure to the circuit board, and wherein the support element is spaced at least as far from the circuit board engagement portion of the lens body as a distal end of the recess.

* * * * *